United States Patent
Park et al.

(10) Patent No.: US 9,442,680 B2
(45) Date of Patent: Sep. 13, 2016

(54) IMAGE FORMING APPARATUS HAVING TONER SAVING FUNCTION AND METHOD FOR PRINTING

(71) Applicant: Samsung Electronics Co., Ltd., Suwon-si (KR)

(72) Inventors: In-ho Park, Suwon-si (KR); Kyeong-man Kim, Yongin-si (KR); Hyung-soo Ohk, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/638,285

(22) Filed: Mar. 4, 2015

(65) Prior Publication Data

US 2015/0261479 A1     Sep. 17, 2015

(30) Foreign Application Priority Data

Mar. 17, 2014     (KR) .................. 10-2014-0031071

(51) Int. Cl.
*G06F 3/12* (2006.01)
*H04N 1/60* (2006.01)
*H04N 1/64* (2006.01)

(52) U.S. Cl.
CPC ........... *G06F 3/1219* (2013.01); *G06F 3/1204* (2013.01); *G06F 3/1241* (2013.01); *H04N 1/6022* (2013.01); *H04N 1/6058* (2013.01); *H04N 1/644* (2013.01); *H04N 2201/0081* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,084,689 A | 7/2000 | Mo | |
| 6,122,441 A | 9/2000 | Tsuji | |
| 6,166,751 A | 12/2000 | Yamada | |
| 6,173,134 B1 | 1/2001 | Nishimura et al. | |
| 6,266,153 B1 | 7/2001 | Davidson et al. | |
| 6,313,925 B1 | 11/2001 | Decker et al. | |
| 6,407,825 B1 | 6/2002 | Couwenhoven et al. | |
| 6,435,657 B1 | 8/2002 | Couwenhoven et al. | |
| 6,628,904 B2 | 9/2003 | Yamada | |
| 6,791,714 B1 | 9/2004 | Ishimura | |
| 6,816,179 B2 | 11/2004 | Hanyu | |
| 6,862,110 B2 | 3/2005 | Harrington | |
| 6,871,029 B2 | 3/2005 | Brewington et al. | |
| 6,873,805 B2 | 3/2005 | Stelter et al. | |
| 6,972,857 B2 | 12/2005 | Mantell et al. | |
| 6,975,428 B1 | 12/2005 | Ernst et al. | |

(Continued)

FOREIGN PATENT DOCUMENTS

JP     2010-278545     12/2010
JP     2013-115657     6/2013

(Continued)

*Primary Examiner* — Paul F Payer
(74) *Attorney, Agent, or Firm* — Staas & Halsey LLP

(57) ABSTRACT

An image forming apparatus having a toner saving function is disclosed. The image forming apparatus includes a printer configured to perform a printing job, a communicator configured to communicate with a host device, a storage configured to store information of a toner saving option which is differently set to respective data characteristics, and a controller configured to, in response to a print data being received from the host device through the communicator, control the printer to detect characteristics of the print data, and print the print data according to the toner saving option which is set to correspond to the detected characteristics.

20 Claims, 12 Drawing Sheets

(56) References Cited

U.S. PATENT DOCUMENTS

| | | | |
|---|---|---|---|
| 7,023,570 | B2 | 4/2006 | Marsden et al. |
| 7,072,072 | B1 | 7/2006 | Balasubramanian et al. |
| 7,149,439 | B2 | 12/2006 | Hirata et al. |
| 7,164,485 | B2 | 1/2007 | Murashima |
| 7,190,485 | B2 | 3/2007 | Couwenhoven et al. |
| 7,196,817 | B2 | 3/2007 | Couwenhoven et al. |
| 7,239,403 | B2 | 7/2007 | Marsden et al. |
| 7,259,885 | B2 | 8/2007 | Kamiya |
| 7,263,301 | B2 | 8/2007 | Martin et al. |
| 7,269,362 | B2 | 9/2007 | Hama et al. |
| 7,298,522 | B2 | 11/2007 | Sugimoto |
| 7,304,767 | B2 | 12/2007 | Sasaki et al. |
| 7,312,895 | B2 | 12/2007 | Ooyama |
| 7,336,910 | B2 | 2/2008 | Kamiya |
| 7,356,267 | B2 | 4/2008 | Kim et al. |
| 7,433,100 | B2 | 10/2008 | Jacob |
| 7,450,867 | B2 | 11/2008 | Itoyama et al. |
| 7,492,484 | B2 | 2/2009 | Okuyama |
| 7,499,660 | B2 | 3/2009 | Kamiya |
| 7,522,311 | B2 | 4/2009 | Marsden et al. |
| 7,602,510 | B2 | 10/2009 | Rombola et al. |
| 7,636,176 | B2 | 12/2009 | Mikami |
| 7,646,997 | B2 | 1/2010 | Hirota |
| 7,668,472 | B2 | 2/2010 | Kella et al. |
| 7,711,277 | B2 | 5/2010 | Ahn et al. |
| 7,729,623 | B2 | 6/2010 | Park |
| 7,734,203 | B2 | 6/2010 | Tanaka |
| 7,760,395 | B2 | 7/2010 | Torikoshi |
| 7,764,897 | B2 | 7/2010 | Takezawa |
| 7,835,035 | B2 | 11/2010 | Patton et al. |
| 7,847,974 | B2 | 12/2010 | Dalrymple et al. |
| 7,876,961 | B2 | 1/2011 | Miyagi |
| 7,881,629 | B2 | 2/2011 | Takeuchi et al. |
| 7,889,402 | B2 | 2/2011 | Chang et al. |
| 7,961,354 | B2 | 6/2011 | Eguchi |
| 8,027,610 | B2 | 9/2011 | Yamazaki |
| 8,064,099 | B2 | 11/2011 | Shirata |
| 8,086,123 | B2 | 12/2011 | Ito |
| 8,090,277 | B2 | 1/2012 | Hitaka |
| 8,095,022 | B2 | 1/2012 | Fujishiro |
| 8,149,456 | B2 | 4/2012 | Fan et al. |
| 8,170,429 | B2 | 5/2012 | Nishikawa |
| 8,199,385 | B2 | 6/2012 | Lee |
| 8,240,551 | B2 | 8/2012 | Nakata |
| 8,284,467 | B2 * | 10/2012 | Patton .......... H04N 1/2307 358/1.9 |
| 8,311,422 | B2 | 11/2012 | Hirayama et al. |
| 8,330,970 | B2 | 12/2012 | Matsushima |
| 8,335,441 | B2 | 12/2012 | Kubo et al. |
| 8,363,248 | B2 | 1/2013 | Matsui et al. |
| 8,395,810 | B2 | 3/2013 | Kanai |
| 8,395,831 | B2 | 3/2013 | Qiao |
| 8,400,694 | B2 | 3/2013 | Lee |
| 8,422,070 | B2 * | 4/2013 | Yamauchi .......... G03G 15/5029 358/1.14 |
| 8,456,682 | B2 | 6/2013 | Yamakawa et al. |
| 8,462,385 | B2 * | 6/2013 | Shestak ............ H04N 1/6016 358/1.2 |
| 8,610,957 | B2 * | 12/2013 | Hirano ............ H04N 1/6022 358/1.9 |
| 8,848,243 | B2 | 9/2014 | Yamada |
| 2001/0012111 | A1 | 8/2001 | Awadalla et al. |
| 2002/0067509 | A1 | 6/2002 | Roylance |
| 2002/0165833 | A1 | 11/2002 | Minowa et al. |
| 2004/0036897 | A1 | 2/2004 | Yamauchi |
| 2005/0018230 | A1 | 1/2005 | Green et al. |
| 2005/0111023 | A1 | 5/2005 | Simpson et al. |
| 2006/0066650 | A1 | 3/2006 | Huang et al. |
| 2006/0146365 | A1 | 7/2006 | Sugita |
| 2006/0203277 | A1 | 9/2006 | Suzuki |
| 2006/0204257 | A1 | 9/2006 | Kawano et al. |
| 2006/0238792 | A1 | 10/2006 | Chang et al. |
| 2007/0019222 | A1 | 1/2007 | Oda et al. |
| 2007/0153308 | A1 | 7/2007 | Zemach et al. |
| 2007/0166059 | A1 | 7/2007 | Kin et al. |
| 2009/0109454 | A1 | 4/2009 | Nagarajan et al. |
| 2009/0195813 | A1 | 8/2009 | Shibaki |
| 2009/0290883 | A1 | 11/2009 | Nakahara |
| 2010/0098443 | A1 | 4/2010 | Oka |
| 2011/0019213 | A1 | 1/2011 | Safonov et al. |
| 2011/0069325 | A1 | 3/2011 | Kawashima et al. |
| 2011/0109929 | A1 | 5/2011 | Korndoerfer |
| 2011/0116108 | A1 | 5/2011 | Ha et al. |
| 2011/0134448 | A1 | 6/2011 | Lee |
| 2011/0135337 | A1 | 6/2011 | Saito et al. |
| 2011/0141505 | A1 | 6/2011 | Haga |
| 2011/0243589 | A1 | 10/2011 | Katayama |
| 2011/0249281 | A1 | 10/2011 | Yamada |
| 2012/0026518 | A1 | 2/2012 | Nishizawa |
| 2012/0069390 | A1 | 3/2012 | Saito et al. |
| 2012/0133992 | A1 | 5/2012 | Hirano |
| 2012/0212758 | A1 | 8/2012 | Eom et al. |
| 2013/0038908 | A1 | 2/2013 | Nagai |
| 2013/0084093 | A1 | 4/2013 | Namikata |
| 2013/0108296 | A1 | 5/2013 | Iinuma |
| 2013/0135683 | A1 | 5/2013 | Sawada |

FOREIGN PATENT DOCUMENTS

| | | |
|---|---|---|
| KR | 10-2005-0114933 | 12/2005 |
| KR | 10-2007-0075576 | 7/2007 |

* cited by examiner

IMAGE FORMING APPARATUS HAVING TONER SAVING FUNCTION AND METHOD FOR PRINTING

CROSS-REFERENCE TO RELATED APPLICATIONS

This application claims the priority benefit under 35 U.S.C. §119(a) of a Korean Patent Application No. 10-2014-0031071 filed on Mar. 17, 2014, the entire disclosure of which is hereby incorporated by reference.

BACKGROUND

1. Field

Embodiments relate to an image forming apparatus having toner saving function and a method for printing thereof, more particularly to, an apparatus printing a print image using toner saving options differently set to respective data characteristics and a method thereof.

2. Description of the Related Art

With increase in distribution of a host device like computer, periphery devices have been widely distributed. Periphery devices indicate an image forming apparatus such as a printer, a scanner, a copy machine, and a multi-function device.

An image forming apparatus decals toner on a printing medium (for example, paper) and prints an image. In offices which have a lot to print, there is a huge burden of a large amount of toner consumption. In addition, toner powder or toner cartridge causes environmental problem, and thus there is a need for a method for printing with toner usage saving technology.

In order to save toner, an image forming apparatus may have a toner saving function. The conventional toner saving function is, in general, to reduce toner usage as much as a preset toner saving ratio and to print data.

However, the conventional toner saving function applies the same toner saving ratio for all data regardless of data characteristics, and therefore, readability of a text or an image of a printout may be degraded. In case of a color printout, color may change and a user may not obtain a printout with desired quality.

Further, the toner saving function may be applied to even a section to which toner saving should not be applied, and thus, a user may not use toner saving function frequently. Accordingly, the toner saving function is not used so much.

SUMMARY

One or more exemplary embodiments solve the abovesaid problem by providing an image forming apparatus which is capable of printing print data by using toner saving options which are set differently to respective data characteristics and a printing method thereof.

In an aspect of one or more embodiments, there is provided an image forming apparatus which may include a printer configured to perform a printing job, a communicator configured to communicate with a host device, a storage configured to store information of toner saving options which are differently set based on respective data characteristics, and a controller, in response to data being received from the host device through the communicator, configured to control the printer to detect characteristics of the data, and print data according to one of the toner saving options which is set to correspond to the detected characteristics.

The apparatus may further include a display configured to display a user interface (UI) screen to set the toner saving options which are differently set based on respective data characteristics.

The controller may control the printer to print the data with toner saving options which are different based on respective data format characteristics.

The controller, in response to the data having a data format undefined in the storage being received, may control the printer to print the data with a default option.

The controller, in response to the data being print data associated with a transcript including a preset logo, may control the printer to print the data with a first toner saving option which corresponds to the preset logo, and the controller, in response to the transcript not including the preset logo, controls the printer to print the print data with a second toner saving option which is different from the first toner saving option.

The controller, in response to the data being print data associated with a transcript including an identification code, may print the data with one of the toner saving options which is different based on types identification codes, and wherein the identification codes may be set differently according to at least one of data importance, user authority, a user division, and a user position.

The controller, in response to the data being a print data associated with a transcript written in a preset format, may print the data with one of the toner saving options which is set to correspond to the preset format.

The toner saving options may include at least one of a color print option, a mono print option, a toner density adjustment option, and a font setting option.

The controller, in response to the printing job being performed by using one of the toner saving options, may control the printer to add identification information indicating that printing is performed according to the one toner saving option to a printout and may print the printout.

The controller, in response to copying of a transcript including the identification information being performed, may control the printer to print the transcript by upwardly adjusting toner density applied to the transcript.

In an aspect of one or more embodiments, there is provided a method for printing an image forming apparatus which may include receiving data from a host device to perform a print job, detecting characteristics of the data, and printing the data according to a toner saving option which corresponds to the detected characteristics of the data, from among saving options which are differently set based on respective data characteristics.

The detecting characteristics of the data may include detecting a data format of the data, wherein the printing may include printing the data with a preset toner saving options based on the detected data format.

The printing of the data may include, in response to the data having an undefined data format being received, printing the data with a default option.

The printing of the data, in response to the data being a print data associated with a transcript including a preset logo, may include printing the data with a first toner saving option which corresponds to the preset logo, and the printing of the data, in response to the transcription not including the preset logo, p with a second toner saving option which is different from the first toner saving option.

The printing of the data, in response to the data on a transcript including an identification code, may include printing the data with one of the toner saving options which is different based on types of the identification codes, and wherein the identification codes may be set differently based on at least one of data importance, user authority, a user division, and a user position.

The printing of the data, in response to the data being print data associated with a transcript written in a preset format, may include printing the data with one of the toner saving options which is set to correspond to the preset format.

The toner saving options may include at least one of a color print option, a mono print option, a toner density adjustment option, and a font setting option.

The printing, in response to the printing job being performed by using one of the toner saving options, may include adding and printing identification information indicating that printing is performed according to one of the toner saving options to print a printout.

The method may further include printing the transcript by upwardly adjusting toner density applied to the transcript, in response to copying of the transcript including the identification information being performed.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
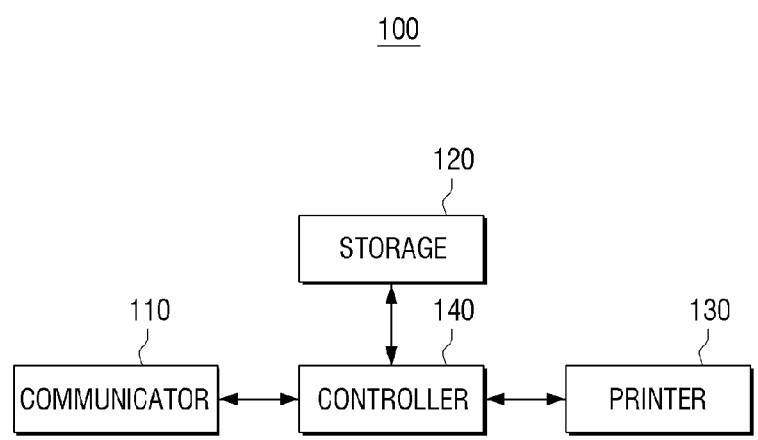
FIG. 1 is a block diagram illustrating the configuration of an image forming apparatus according to an exemplary embodiment.

Reference will now be made in detail to embodiments, examples of which are illustrated in the accompanying drawings, wherein like reference numerals refer to the like elements throughout. Embodiments are described below by referring to the figures.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating the configuration of an image forming apparatus according to an exemplary embodiment. An image forming apparatus 100 of FIG. 1 may include a printer, a scanner, a copy machine, and a facsimile, and may be realized in various types such as a multi-function device which has at least two functions from among functions of a printer, a scanner, a copy machine, and a facsimile.

The image forming apparatus 100 includes a communicator 110, a storage 120, a printer 130, and a controller 140.

The communicator 110 communicates with a host device.

The storage 120 stores various programs or applications associated with operations of the image forming apparatus 100. Further, the storage 120 stores information on toner saving options which are differently set to respective data characteristics (set to corresponding respective data characteristics or based on respective data characteristics). The data characteristics may include data format characteristics, characteristics to include a preset logo characteristics including a preset identification code, and characteristics including a preset form.

The data format characteristics may include a portable document format (PDF), a tag image file (TIF) format, and a joint photographic experts group (JPEG) format, and toner saving options which are different to respective formats may be set. For example, as to the PDF format, a toner saving option including "mono print (total)" and "toner density (70%)" may be set. That is, when print data has the PDF format, the toner saving option may be set such that color part included in the print data is printed as mono print, and toner density (70%)" is used for print.

The toner saving option according to data characteristics may be set by a user who uses the image forming apparatus 100. A user may set various toner saving options for data characteristics which the user frequently uses.

The printer 130 performs a printing job.

The controller 140, when print data is received from a host device through the communicator 110, may control the printer 130 to perform printing for the print data. In this case, the controller 140 detects the characteristics of the print data and identifies a toner saving option which corresponds to the detected characteristics of the print data in the storage 120. In addition, the controller may control the printer 120 to print the print data according to the identified toner saving option.

According to the image forming apparatus 100 illustrated in FIG. 1, toner saving options may be preset differently to respective data characteristics in consideration of a data format, print purpose, or level of importance, in order to print the print data with the toner saving option which is suitable to the data characteristics. Accordingly, the image forming apparatus 200 may improve readability or recognizability of a printout while saving toner.

Figure 2:
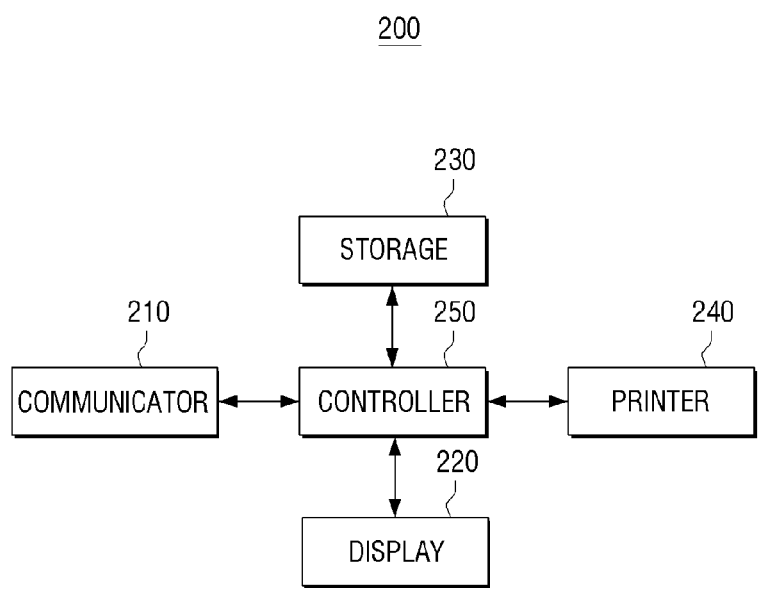
FIG. 2 is a block diagram illustrating the configuration of an image forming apparatus according to an exemplary embodiment.

FIG. 2 is a block diagram illustrating the configuration of an image forming apparatus according to an exemplary embodiment. According to FIG. 2, an image forming apparatus 200 includes a communicator 210, a display 220, a storage 230, a printer 240, and a controller 250.

The communicator 210 communicates with a host device.

The display 220 displays information associated with operations of the image forming apparatus 200, and displays a UI screen for user setting. The display 220 may be an LCD display panel or a touch panel.

The storage 230 stores various programs or applications associated with operations of the image forming apparatus 100.

The printer 240 performs a printing job.

The controller 250 controls overall operations of the image forming apparatus 200.

When a user command is input to set a toner saving option, the controller 250 controls the display 220 to display a UI screen to set a toner saving option according to data characteristics.

The data characteristics may include data format characteristics, characteristics including a preset logo, characteristics including a preset form, or the like.

Further, the toner saving option relates to toner saving option to be applied to print data which has predetermined data characteristics, the toner saving option may include at least one of a color print option, a mono print option, a toner density adjustment option, and a font setting option. The toner saving option may further include a print option of a logo or a form included in the print data. The above will be further explained with reference to FIG. 3.

On a UI screen, a user may set required toner saving option associated with the data characteristics which a user frequently uses, before printing.

For example, when a user belongs to a school or a laboratory, the user may frequently use print data in PDF format, and thus, when printing the print data in the PDF format, the user may set which toner saving option to use through the UI screen.

When a toner saving option is set to respective data characteristics on a UI screen by using this method, the controller 250 stores information of toner saving options which are differently set to respective data characteristics in the storage 230.

The controller 250, when print data is received from a host device through the communicator 210, detects characteristics of the print data. That is, the controller may detect whether print data has the data characteristics stored in the storage 230.

To be specific, information of characteristics such as the PDF format or the image format (for example, JPEG, TIF, graphics interchange format (GIF), bitmap file (BMP), etc.) may be included in print data. Accordingly, the controller 250 may detect the characteristics of print data by identifying information of the characteristics included in print data.

Or, the controller 250 converts print data into a bitmap image, and extracts from the bitmap image a logo, an identification code or form stored in the storage 230. For example, when a logo is detected from a bitmap image, the controller 250 may identify that print data includes a preset logo.

The controller 250, when characteristics of print data are detected, identifies the toner saving option which is set to correspond to the characteristics of the print data in the storage 230, and controls the printer 240 to print the print data according to the toner saving option.

For example, when print data has the PDF format, the controller 250, may identify the toner saving option corresponding to the PDF format at the storage 230, and control the printer 240 to print the print data according to the toner saving option.

The controller 250, when characteristics of print data are not detected, controls the printer 240 to print the print data with a default option. In an embodiment, the default option may be an option to print data as original data, or print with a predesignated toner density.

As described above, when printing print data according to toner saving options based on the characteristics of print data, the controller 250 may control the printer 240 to add identification information to a printout and print the printout. The identification information indicates that the printout is printed according to the toner saving option, and may include information on the toner saving option which is applied to printing. Accordingly, when copying of the printout (transcript) including identification information is performed, the controller 250 may control the printer 240 to print printout by upwardly adjust toner density.

According to the image forming apparatus 200 illustrated in FIG. 2, print data may be printed by using toner saving options which are differently set to respective data characteristics according to data format, printing purpose, or degree of importance.

In particular, the toner saving options differently set to respective data characteristics are preset before printing, and thus, a user does not need to set this option whenever the user performs printing. Accordingly, the image forming apparatus 200 may improve user convenience according to setting of the toner saving option.

Further, as to print data which has characteristics requiring readability or recognizability, a user may obtain a printout with desired quality by setting different toner saving options. Further, in the same page, for the parts which do not need toner saving such as a logo or a form, printing without toner saving option may be set. Accordingly, the image forming apparatus 200 may improve usability of toner saving function, and improve readability or recognizability of a printout while saving toner.

Figure 3:
FIG. 3 is a view illustrating a UI screen for setting a toner saving option according to data characteristics.

FIG. 3 is a view illustrating a UI screen for setting a toner saving option according to data characteristics. Referring to FIG. 3, a toner saving option setting screen 300 is provided to set toner saving options to respective data characteristics, and the screen includes a data characteristics selection area 310, a preview area 320, a toner saving option selection area 330, and a default option selection area 340.

The data characteristics selection area 310 is an area to select data characteristics, and when an arrow 310a is selected, a plurality of selectable data characteristics are listed.

The plurality of data characteristics may include data formats such as a PDF format, an image format 1 (TIFF format), image format 2 (JPEG format). In addition, logo 1 which indicates Samsung or logo 2 which indicates Google may be included.

The plurality of data characteristics may include importance of print data, that is, identification codes 1 and 2 indicating whether print data is a general document or a confidential document may be included, and identification codes 3 and 4 indicating a division of a user may be included. Further, identification codes 5 and 6 indicating a position of a user may be included. The plurality of data characteristics may include form 1 indicating a form of a specific insurance company or form 2 indicating a form of a specific report.

Accordingly, a user may select one of the data characteristics from among a plurality of data characteristics in the data characteristics selection area 310.

The preview area 320, when a user selects a logo, displays an identification code, or a form in the data characteristics selection area 310 as the preview type.

For example, when a user selects "identification code 1 ('general document' barcode)", the image forming apparatus 200 may display a barcode which corresponds to "identification code 1" in the preview area 320.

Accordingly, when a user selects one of the data characteristics, the user may identify a logo, an identification code, or a form displayed in the preview area 320, and check whether the desired data characteristics are selected accurately.

The toner saving option selection area 330 is an area to select the toner saving option which is selected in the data characteristics selection area 310.

The toner saving option includes "color printing (image only)" which is an option to print only images in color, "color printing (text only)" which is an option to print only texts in color. In addition, the option includes "mono printing (all)" which is an option to print all the print data as mono, "mono printing (image only)" which is an option to print only images as mono, and "mono printing (text only)" which is an option to print only texts as mono. These five options may be selected when print data includes color.

The toner saving option may include "toner density (user input)" which is an option to print with toner density which is input by a user, "font 1 (dot print)" which is an option to print fonts in dot type, and "font 2 (slash print)" which is an option to print fonts in slash type.

Further, the toner saving option may include "logo part (original)" which is an option to print logo included in print data as original and "form part (original)" which is an option to print a form included in print data as original.

Various toner saving options have been explained above, but the toner saving option is not limited to FIG. 3, and may include other options usable for toner saving.

When a user selects "identification code 1 ('general document' bar code)" in the data characteristics selection area 310, and selects "mono printing (all)" and "toner density (70%)" as the toner saving option to be applied to "identification code 1", and then selects OK button 351, the image forming apparatus 200 may set the toner saving option to print the print data having "identification code 1 ('general document' bar code)" as mono and to print with toner density of 70%.

That is, "mono printing (all)" and "toner density (70%)" may be toner saving option which is set to correspond to the data characteristics of "identification code 1 ('general document' bar code)". In the same manner, toner saving options may be set for other data characteristics.

The default option selection area 340 is an area to select a default option to be applied when printing print data not having data characteristics included in the data characteristics selection area 310, or print data having data characteristics not selected in the data characteristics selection area 310.

As a default option, there are "printing as original" to print data as original without saving toner and "printing with 60% toner density", and a user may select one of these options as a default option.

When a user selects a cancel button 352 in a toner saving option setting screen 300, the image forming apparatus 200 terminates display of the toner saving option 300.

When a user selects toner saving options which are differently set to respective data characteristics on the toner saving option setting screen 300, the image forming apparatus 200 may store information on the toner saving options which are differently set to respective data characteristics.

As described above, by setting the toner saving option for different data characteristics prior to printing, the image forming apparatus 200 may apply the toner saving options according to the characteristics of print data, without separately setting toner saving options.

Figure 4A:
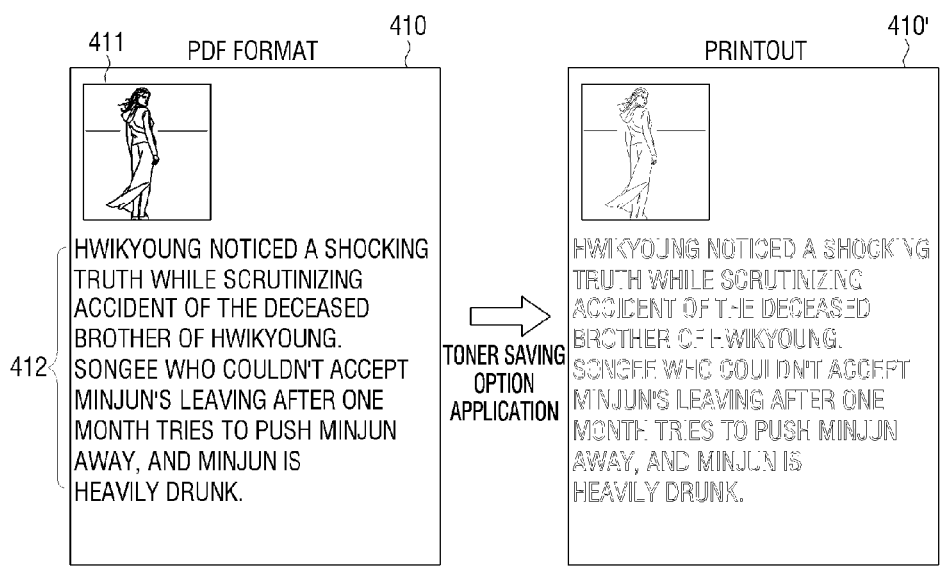
FIGS. 4A and 4B are views illustrating a method for printing by using a toner saving option according to data characteristics format.
Figure 4B:
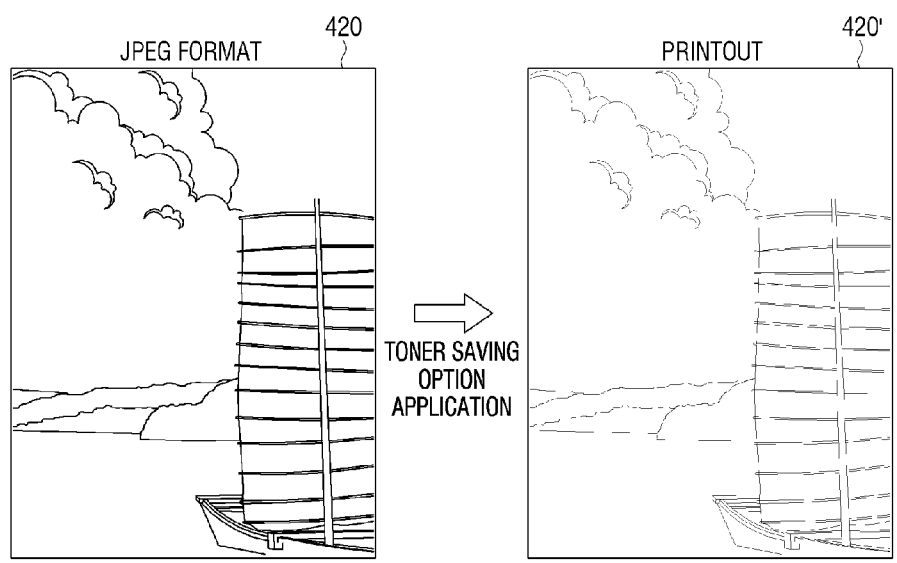

FIGS. 4A and 4B are views illustrating a method for printing by using a toner saving option according to data characteristics format.

Referring to FIG. 4A, the image forming apparatuses 100 and 200, when the print data 410 having the PDF format is received, print the print data 410 by applying the first toner saving option corresponding to the PDF format.

For example, when the first toner saving option corresponding to the PDF format includes "mono printing (all)" and "toner density (70%)", the image forming apparatuses 100 and 200 print the printout 410' while printing the print data 410 as mono according to the first toner saving option, and printing data with toner density of 70%.

Referring to FIG. 4B, the image forming apparatuses 100 and 200, when the print data 420 having JPEG format which corresponds to image format 2 is received, print the print data 420 by applying the second toner saving option corresponding to JPEG format.

For example, when the second toner saving option corresponding to the JPEG format includes "mono printing (all)" and "toner density (60%)", the image forming apparatuses 100, 200 print the printout 420' while printing the print data 420 as mono according to the second toner saving option, and printing the data with 60% toner density.

Figure 5:
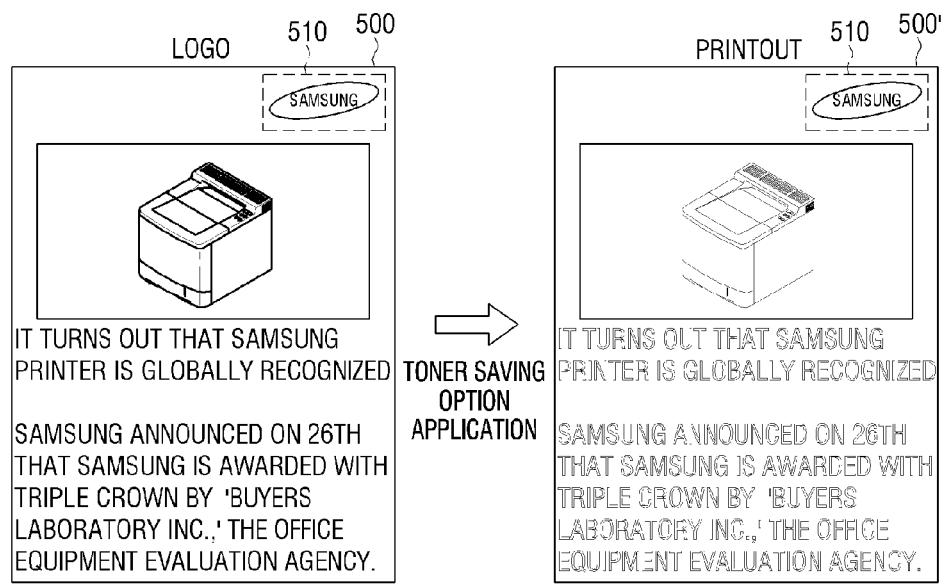
FIG. 5 is a view illustrating a method for printing by using a toner saving option according to data characteristics including a logo.

FIG. 5 is a view illustrating a method for printing by using a toner saving option according to data characteristics including a logo.

Referring to FIG. 5, the image forming apparatuses 100 and 200, when the print data 500 with respect to the transcript including the preset logo 510 is received, prints the print data 500 by applying the third toner saving option corresponding to the preset logo 510.

For example, when the third toner saving option includes "logo part (as original)" and "toner density (80%)", the image forming apparatuses 100, 200 print the printout 500' while printing the logo 510 of the print data 500 as original according to the third toner saving option and printing the remaining part other than the logo 510 with 80% toner density.

In the printout 500', the logo 510 is printed without toner saving, and the parts other than the logo 510 are printed with 80% toner density.

Figure 6A:
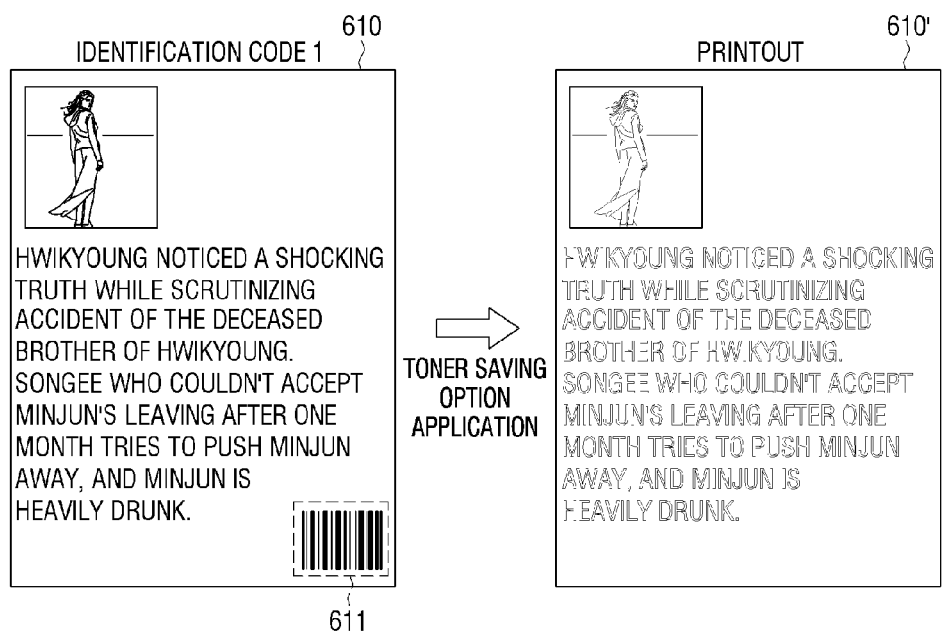
FIGS. 6A and 6B are views illustrating a method for printing by using a toner saving option according to characteristics of data including an identification code.
Figure 6B:
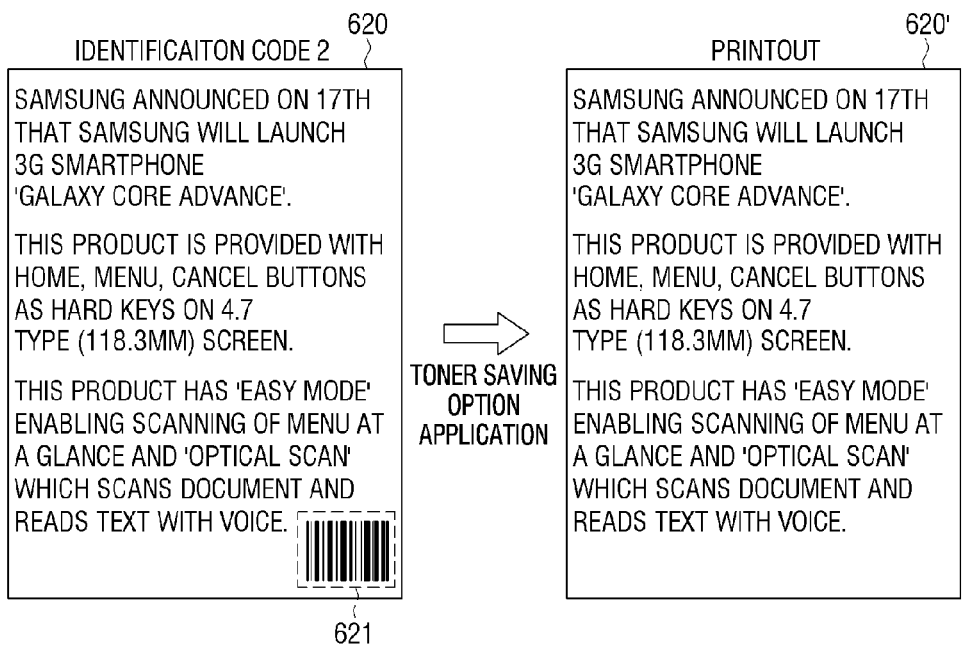

FIGS. 6A and 6B are views illustrating a method for printing by using a toner saving option according to data characteristics including an identification code.

Referring to FIG. 6A, the image forming apparatuses 100 and 200, when the print data 610 with respect to transcript including a preset identification code 1 is received, print the print data 610 according to the fourth toner saving option corresponding to the identification code 1 611.

The identification code 1 611 indicates that the print data 610 is "general document", and the fourth toner saving option may include "toner density (50%)".

Accordingly, the image forming apparatuses 100 and 200 may read identification code 1 611 from the print data 610, and recognize that the print data 610 is "general document", and outputs the printout 610' by printing with 50% toner density of the print data 610 according to the fourth toner saving option. In this case, the identification code 611 is identification information to indicate the characteristics of the print data 610, and thus, is not included in the printout 610'.

Referring to FIG. 6B, the image forming apparatuses 100 and 200, when the print data 620 is received with respect to transcript including the preset identification code 2 621, prints the print data 600 according to the fifth toner saving option corresponding to the identification code 2 621.

The identification code 2 621 indicates that the print data 620 is "confidential document", and the fifth toner saving option may include "toner density (100%)". That is, the data which has higher importance such as a confidential document may be for reporting to superior authority or for internal keeping only, and thus, the confidential document needs to be printed as original without toner saving.

Therefore, the image forming apparatuses 100 and 200 may read the identification code 2 621 from the print data 620 and recognize that the print data 620 is "confidential document", and output the printout 620' with 100% toner density based on the print data 620 according to the fourth toner saving option. In this case, the identification code 621 is identification information to indicate the characteristics of the print data 620, and thus, is not included in the printout 620'.

FIGS. 6A and 6B describe the identification codes 1 and 2 611, 621 as an example of importance of data, but are not limited thereto.

To be specific, the identification codes which are assigned differently according to user authority, user division, or user position may be included in print data. Therefore, the image forming apparatuses 100 and 200 may recognize user authority, user division, or user position according to the identification code, and print the print data by using toner saving options which are differently set to respective identification codes.

Figure 7:
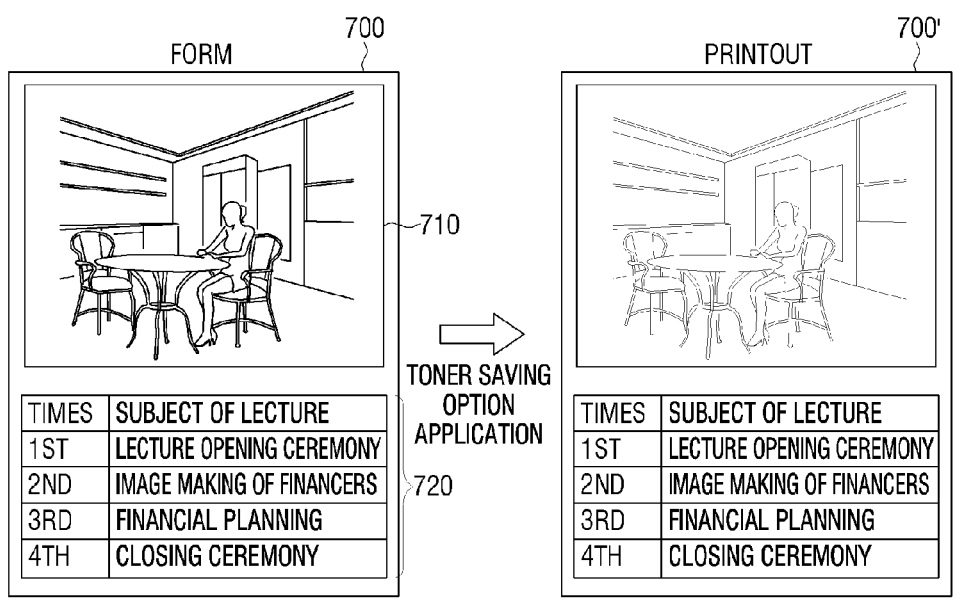
FIG. 7 is a view illustrating a method for printing by using a toner saving option according to data characteristics including a form.

FIG. 7 is a view illustrating a method for printing by using a toner saving option according to data characteristics including a form.

Referring to FIG. 7, print data 700 includes an image 710 and a form 720. As such, when the print data 700 with respect to transcript including the preset form 720 is received, the image forming apparatuses 100 and 200 print the print data 700 according to the sixth toner saving option corresponding to the form 720.

For example, when the sixth toner saving option includes "form part (as original)" and "toner density (70%)", the image forming apparatuses 100 and 200 print the printout 700' while printing the form 720 as original from the print data 700 according to the sixth toner saving option, and printing the remaining parts other than the form 720 with 70% toner density.

In the printout 700', the form 720 is printed without toner saving, and the image 710 other than the form 720 is printed with 80% toner density of the original.

Figure 8:
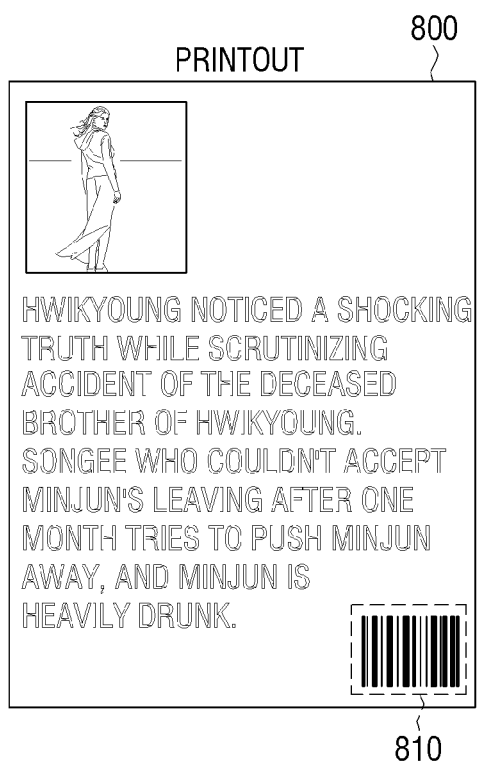
FIG. 8 is a view illustrating a print out printed with identification information.

FIG. 8 is a view illustrating a print out printed with identification information.

FIG. 8 illustrates a printout 800 which is printed according to the toner saving method according to an embodiment. The image forming apparatuses 100 and 200, when printing the printout 800, may add identification information 810 indicating that the data is printed according to the toner saving option. The identification information 810 may be a bar code or QR code indicating that the data is printed according to the toner saving option.

Further, the identification information 810 may include information on the toner saving option. For example, when printing the printout 800, when the toner saving option including "mono printing" and "toner density (70%)" is applied, information of "mono printing" and "toner density (70%)" may be included in the identification information 810.

When the printout 800 is copied by the image forming apparatuses 100 and 200 or other image forming apparatuses, the image forming apparatuses 100 and 200 or other image forming apparatuses may read the identification information 810 included in the printout 800. Accordingly, the image forming apparatuses 100 and 200 or other image forming apparatuses may recognize that the printout 800 is printed according to the toner saving option, through the identification information 810.

The image forming apparatuses 100 and 200 or other image forming apparatuses, when copying the printout 810, may automatically adjust toner density upward. In this case, with reference to the toner saving option included in the identification information 810, for example, "toner density (70%)", and toner density may be adjusted upward by 30%.

Accordingly, the image forming apparatuses 100 and 200 or other image forming apparatus, by printing the text or images included in the printout 800 to be thick, may improve readability or recognizability of the copy of the printout 800.

In the above, it is explained that, when it is recognized that the printout 800 is printed according to the toner saving option by reading the identification information 810, the image forming apparatuses 100 and 200 or other image forming apparatuses automatically adjust toner density upward and print the printout 800, but embodiments are not limited thereto.

That is, the image forming apparatuses 100 and 200 or other image forming apparatuses may read the identification information 810 and when it is recognized that the printout 800 is printed in accordance with the toner saving option, and display a UI screen asking whether to print the printout 800 as original, or print the printout by adjusting toner density upward. In addition, the printout 800 may be printed in the printing method selected by a user on the UI screen.

Figure 9:
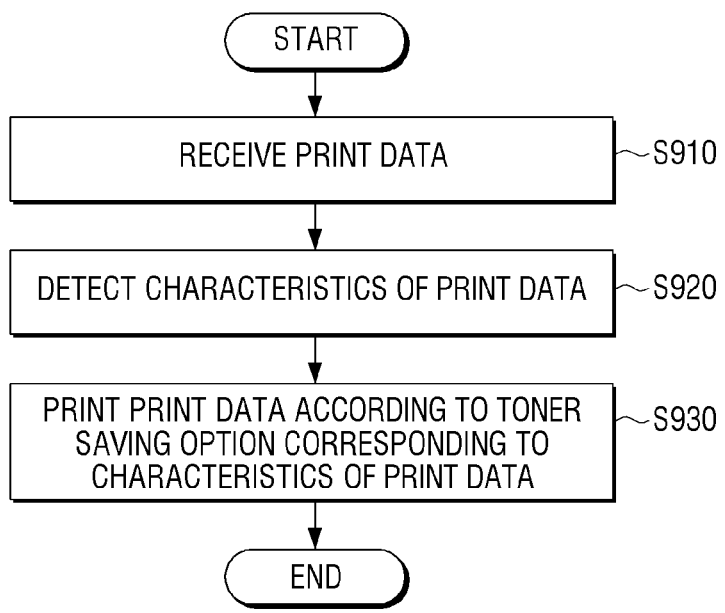
FIG. 9 is a flowchart provided to explain a method for printing according to an exemplary embodiment.

FIG. 9 is a flowchart provided to explain a method for printing according to an exemplary embodiment. The printing method illustrated in FIG. 9 may be performed by the image forming apparatus.

The image forming apparatus, when print data is received from a host device (S910), detects the characteristics of print data (S920). The characteristics of print data may be the data format of print data, or print data characteristics with respect to transcript including a preset logo, a preset identification code, or a preset form.

The image forming apparatus, from the toner saving options which are differently set to respective data characteristics, prints print data according to the toner saving option corresponding to the characteristics of print data detected at S920 (S930). Accordingly, the image forming apparatus prints data by using different toner saving options according to the print data characteristics, and thus, toner saving is available according to type of transcript.

Figure 10:
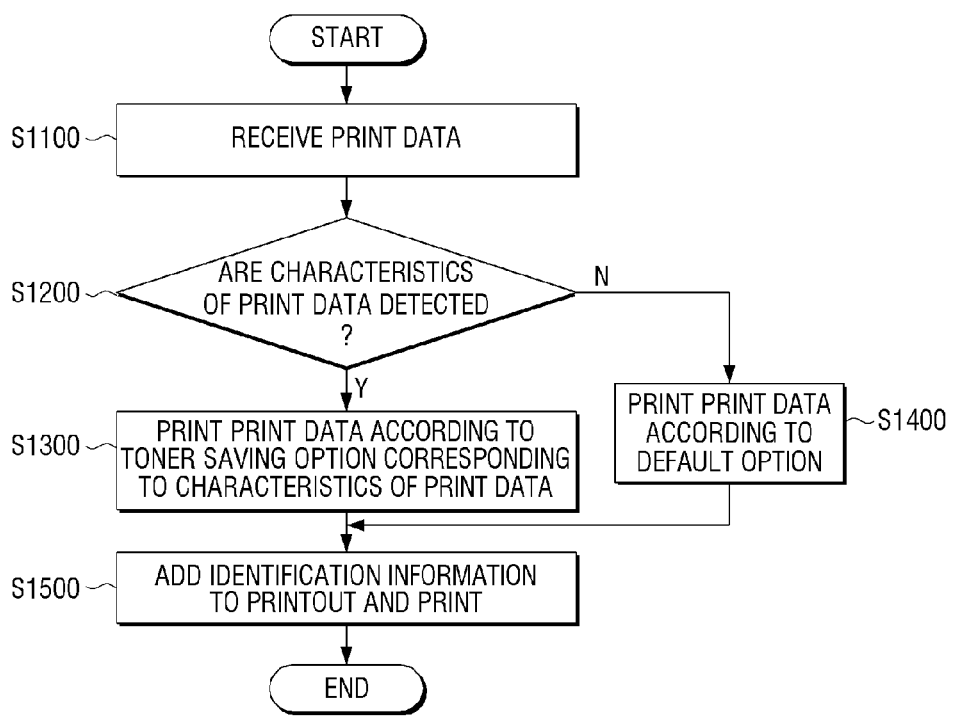
FIG. 10 is a flowchart provided to explain a method for printing according to an exemplary embodiment.

FIG. 10 is a flowchart provided to explain a method for printing according to an exemplary embodiment. The printing method illustrated in FIG. 10 may be performed by the image forming apparatus.

The image forming apparatus receives print data from a host device (S1100).

If the characteristics of print data are detected from print data (S1200), the image forming apparatus prints print data according to the toner saving option corresponding to the characteristics of print data (S1300). For example, when it is detected that print data has PDF format, the image forming apparatus may print the print data by using the toner saving options "mono printing" and "toner density (70%)" which are the toner saving options that are set to correspond to the PDF format. In addition, as to print data having other characteristics, print data may be printed by using the corresponding toner saving option.

From print data, when the characteristics of print data are not detected (S1200), the image forming apparatus prints print data according to a default option (S1400). A user may set beforehand the toner saving option for the data characteristics which a user frequently uses, and set the option in the image forming apparatus. If the print data received from the host device does not have any one of the preset data characteristics, the image forming apparatus may print the print data according to a default option. The default option may be an option to print the print data without toner saving, or print the print data with preset default toner density.

When performing printing by using the toner saving option, the image forming apparatus adds identification information to the printout and print accordingly (S1500). The identification information indicates that print data is printed according to the toner saving option, the information may include a bar code or a QR code.

When a document including identification information is copied, the image forming apparatus such as a copy machine or a multi-function machine may recognize that toner density of the document is low. Therefore, the image forming apparatus may automatically adjust toner density applied to the document upward and print the data.

A method according to the above-described exemplary embodiments may be coded as software. The software can be stored and provided in a non-transitory computer readable medium, and be used for devices such as a host device or an image forming apparatus.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs including Blu-ray DVD(s); magneto-optical media, such as optical disks; universal serial bus(es)(USB(s)) and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

The foregoing embodiments and advantages are merely exemplary and are not to be construed as limiting. The present disclosure can be readily applied to other types of apparatuses. Also, the description of exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus, comprising:
   a printer configured to perform a printing job;
   a communicator configured to communicate with a host device;
   a storage configured to store information of toner saving options which are differently set based on respective data characteristics including data format characteristics including one of portable document format (PDF), tag image file (TIF) format, and a joint photographic experts group (JPEG) format; and
   a controller, in response to data being received from the host device through the communicator, configured to control the printer to detect characteristics of the data, and print the data according to one of the toner saving options which is set to correspond to the detected characteristics.

2. The apparatus as claimed in claim 1, further comprising:
   a display configured to display a user interface (UI) screen to set the toner saving options which are differently set based on respective data characteristics.

3. The apparatus as claimed in claim 1, wherein the controller controls the printer to print the data with toner saving options which are different based on respective data format characteristics of the data.

4. The apparatus as claimed in claim 3, wherein the controller, in response to the data having a data format undefined in the storage being received, controls the printer to print the data with a default option.

5. The apparatus as claimed in claim 4, wherein the default option is to print the data as original data or print the data with a predesignated toner density.

6. The apparatus as claimed in claim 1, wherein:
   the controller, in response to the data being print data associated with a transcript including a preset logo, controls the printer to print the data with a first toner saving option which corresponds to the preset logo, and
   the controller, in response to the transcript not including the preset logo, controls the printer to print the print data with a second toner saving option which is different from the first toner saving option.

7. The apparatus as claimed in claim 1, wherein:
   the controller, in response to the data being print data associated with a transcript including an identification code, prints the data with one of the toner saving options which are different based on types of identification codes, and
   the identification codes are set differently based on at least one of data importance, user authority, a user division, and a user position.

8. The apparatus as claimed in claim 1, wherein the controller, in response to the data being print data associated with a transcript written in a preset format, prints the data with one of the toner saving options which is set to correspond to the preset format.

9. The apparatus as claimed in claim 1, wherein the toner saving options comprise at least one of a color print option, a mono print option, a toner density adjustment option, and a font setting option.

10. The apparatus as claimed in claim 1, wherein the controller, in response to the printing job being performed by using one of the toner saving options, controls the printer to add identification information indicating that printing is performed according to the one toner saving option to a printout and prints the printout.

11. The apparatus as claimed in claim 10, wherein the controller, in response to copying of a transcript including the identification information being performed, controls the printer to print the transcript by upwardly adjusting toner density applied to the transcript.

12. A method for printing an image forming apparatus, the method comprising:
receiving data from a host device to perform a print job;
detecting characteristics of the data, the data characteristics including data format characteristics including one of portable document format (PDF), tag image file (TIF) format, and a joint photographic experts group (JPEG) format; and
printing the data according to a toner saving option which corresponds to the detected characteristics of the data, from among toner saving options which are differently set based on respective data characteristics.

13. The method as claimed in claim 12, wherein:
the detecting characteristics of the data comprises detecting a data format of the data, and
the printing comprises printing the data with one of the toner saving options based on the detected data format.

14. The method as claimed in claim 13, wherein the printing of the data comprises, in response to the data having an undefined data format being received, printing the data with a default option.

15. The method as claimed in claim 12, wherein the printing of the data, in response to the data being print data associated with a transcript including a preset logo, comprises printing the data with a first toner saving option which corresponds to the preset logo, and the printing of the data, in response to the transcript not including the preset logo, with a second toner saving option which is different from the first toner saving option.

16. The method as claimed in claim 12, wherein:
the printing of the data, in response to the data on a transcript including an identification code, comprises printing the data with one of the toner saving options which is different based on types of identification codes, and
the identification codes are set differently based on at least one of data importance, user authority, a user division, and a user position.

17. The method as claimed in claim 12, wherein the printing of the data, in response to the data being print data associated with a transcript written in a preset format, comprises printing the data with one of the toner saving options which is set to correspond to the preset format.

18. The method as claimed in claim 12, wherein the toner saving options comprise at least one of a color print option, a mono print option, a toner density adjustment option, and a font setting option.

19. The method as claimed in claim 12, wherein the printing, in response to the print job being performed by using one of the toner saving options, comprises adding printing identification information indicating that printing is performed based on one of the toner saving options to a printout and printing the printout.

20. The method as claimed in claim 19, further comprising:
printing a transcript by upwardly adjusting toner density applied to the transcript, in response to copying of the transcript including the identification information being performed.

* * * * *